United States Patent Office 3,443,945
Patented May 13, 1969

3,443,945
PHOTOSENSITIVE COLOR-FORMING
COMPOSITION
Harry L. Fichter, Jr., Lakewood, Ohio, assignor to
Horizons Research Incorporated, a corporation of
Ohio
No Drawing. Filed Oct. 22, 1965, Ser. No. 502,498
Int. Cl. G03c 5/24, 1/68
U.S. Cl. 96—48                                        7 Claims

ABSTRACT OF THE DISCLOSURE

A camera speed photosensitive printout composition comprising an N-vinyl amine, an organic halogen compound, a triaryl group V compound and a color-forming dye progenitor which is a carbinol base of a diaryl- or triaryl-methane dye.

This invention relates to a photographic film. More particularly, it relates to a novel film which is particularly useful in the duplication of an original subject, editing of said subject and subsequent reproduction of the edited subject.

Such utility is commonly required in the preparation of engineering drawings or in the preparation of other records wherein the original data is to be modified or altered in some detail, as for example, the addition of new points to a graph to bring it up to date and where the corrected, amended or updated text is then to serve as a master for subsequent reproduction.

The invention will be better understood from the following examples of photosensitive compositions which provide a speed suitable for the projection hereinafter described.

COMPOSITION A (Magenta Image)

3 grams N-vinylcarbazole
3 grams carbon tetrabromide or other organic halogen compound
100 milligrams triphenylstibine or other triaryl group V compound
50 milligrams dimethylaminostyryl quinoline
10 cc. of a 1% solution in acetone of a copolymer of styrene and acrylonitrile (Tyril 767, Dow Chemical)

As compared with the composition noted above, and similar compositions, the photosensitive compositions of the present invention possess an enhanced sensitivity and speed by virtue of the incorporation thereinto of a carbinol base of a diphenylmethane dye or triphenylmethane dye. Such bases may be represented by the general formulae

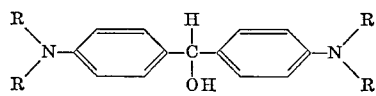

and

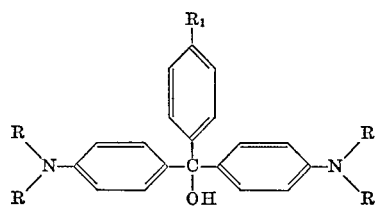

wherein each R is selected from the group consisting of H, alkyl, aralkyl, and aryl and each R may be the same or differ from others; and R represents a monovalent radical selected from the group consisting of —H and

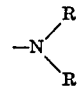

wherein R has the same meaning as above.

One such composition, representative of the invention, is as follows:

COMPOSITION B 3 grams N-vinylcarbazole
3 grams carbon tetrabromide
100 milligrams triphenylstibine
1.0 cc. of a 0.25% solution of the carbinol of opal blue in benzene representing 2.5 milligrams of solid carbinol opal blue
10 cc. Tyril 767 (1.0% solution in acetone) Opal Blue Carbinol:

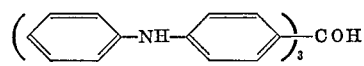

In the above compositions it is possible to substitute other materials for each of the constituents listed.

For example, instead of the N-vinylcarbazole other N-vinyl compounds listed in United States Patent 3,042,517 may be used.

Instead of carbon tetrabromide other relatively volatile compounds represented by the formula $A-C-X_3$ may be used, A being any of H, Cl, Br, I, alkyl, haloalkyl, aryl, aralkyl, or aroyl and each X being either Cl, Br or I. Suitable compounds include $CHI_3$, $C_2Br_6$ and $HC_2Br_5$.

The triphenylstibine may be replaced in part or in its entirety by triphenylarsine, triphenylbismuthine or triphenylphosphine.

Both of the above formulas are coated at 0.0015 wet thickness on transparentized paper. The transparentizing agent can be polysytrene, polymethacrylate or any of the other commonly used transparentizing resins. The particular paper which was used is transparentized with a commercially available epoxy composition. With Compositions A and B the coating procedure and resulting film may be handled under yellow safelights.

Each of Compositions A and B are sensitive to visible light and the only difference they display is in the color of the printout image. Each of the formulas will give a direct printout image when exposed to a 15× enlargement using a 500-watt projector and a 2 second exposure. Heat fixing is achieved in a forced air oven at 100° C. for 15 seconds. The resulting image is a relief image, slightly raised above the surface of the paper, such as described in my previous application Ser. No. 473,238, filed July 19, 1965, which issued as United States Patent 3,374,094 on Mar. 19, 1968. The 15 second fixing time is frequently not sufficient to prevent some background coloration from appearing on standing or during the reproduction of this image onto diazo material using the intense light sources found in diazo printers. However, this residual background color usually does not interfere with the diazo printing since its spectral absorption characteristics do not block the actinic radiation needed for diazo activity. The 15 second heating time is suitable for fixing the resist image or the raised relief image. Repeated exposures to the ultraviolet light for diazo printing does not affect the relief image of the original intermediate.

This system as described has sufficient speed that high contrast negative images can be formed when film strips of the above coating are placed in a camera and exposed to sunlight using an f/1.9 lens and one second exposure. Some resist formation is noted when half second exposures are used but this is not enough for a good sharp image.

The negative images are very high contrast and exhibit little or no tone rendition therefore its use would be limited to line work only.

Composition B is coated 0.0015 wet thickness on transparentized paper. The system may be handled under yellow safelight conditions such as Wratten series OA filters or the conventional household bug lights. Coatings of the above composition give direct printout images on one second exposure to a sun lamp at 12-inch distance or to the arc light of a conventional graphic arts printer such as the Nu-Arc. Raised images are observed just as with the previously described formulations after heat fixing for 15 seconds in a forced draft oven at 100° C.

The range of quantities for preparing each of the cited compositions is broad. The N-vinylamine can be present in the range of 0.5 gram to 5 grams and its upper range is limited only to the extent of its solubility in the coating mixture. The activating organic halogen compound again may be present in the range of 0.5 gram to 5 grams depending upon the degree of its activity and its solubility in the coating mixture. The triaryl Group V compound should be present in amounts ranging from 25 milligrams to 200 milligrams depending on the particular compound and its solubility.

The range of addition of color-forming compounds which make this invention novel over the system of copending application Ser. No. 487,398, filed Sept. 15, 1965 is much more critical than the range of the monomer and its activator described above. This present invention achieves in a single layer that which the copending application describes as being done in two layers; that is, it provides a direct printout image on exposure which is capable of being amended or updated and following a heating step, that simultaneously fixes the printout image, makes visible an image made latent by the same exposure that formed the printout. It is the presence of small quantities of these color-forming dye progenitors that are responsible for giving the printout and their amounts are more rigidly limited. They must be present in sufficient quantity to provide an image of suitable quality that the draftsman can work with it. If present in too high a quantity, however, they will give too much color to the background (fog). The magenta-forming compound of Composition A, namely the styryl quinoline compound should fall in the range of 20 milligrams to 150 milligrams. For Composition B the range of carbinol of opal blue content should be kept between 0.5 and 5.0 milligrams for even at these upper limits, the amount of background color is becoming excessive.

Having now described the invention it is not intended that it be limited except as may be required by the appended claims.

I claim:
1. In a photosensitive composition comprising a mixture consisting essentially of at least one of each of the following:
   (a) an N-vinylamine;
   (b) an organic halogen compound in which at least three halogen atoms are attached to a single carbon atom and represented by the formula A–C–$X_3$ wherein A is selected from the group consisting of H, Cl, Br, I, alkyl, haloalkyl, aryl, aralkyl and aroyl and each X is an atom of Cl, Br or I; and
   (c) a triaryl group V compound selected from the group consisting of triaryl compounds of Sb, As, Bi and P; the improvement which comprises including in said mixture a color-forming dye progenitor selected from the group consisting of carbinol bases of diarylmethane dyes represented by the general formula

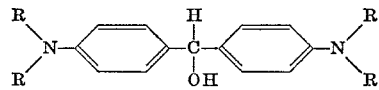

wherein each R is selected from the group consisting of H, alkyl, aralkyl, and aryl and each R may be the same or different; and carbinol bases of triarylmethane dyes represented by the general formula

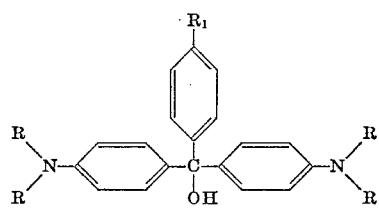

wherein $R_1$ represents a monovalent radical selected from the group consisting of—H and

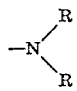

and R is selected from the group consisting of H, alkyl, aralkyl, and aryl and each R may be the same or different.

2. The composition of claim 1 wherein the N-vinylamine is N-vinylcarbazole.

3. The composition of claim 1 wherein the triaryl Group VB compound is a triphenyl compound.

4. The composition of claim 1 wherein the carbinol base is the carbinol of opal blue.

5. The composition of claim 1 wherein the constituents are
   (a) N-vinylcarbazole,
   (b) $CBr_4$,
   (c) triphenylstibine,
   (d) carbinol of opal blue.

6. The composition of claim 1 wherein the relative proportions of the several constituents are as follows:
   between 0.5 and 5 parts by weight of N-vinylamine;
   between 0.5 and 5 parts by weight of organic halogen compound;
   between .025 and .200 parts by weight of triaryl group V compound; and
   between 0.0005 and 0.005 parts by weight of carbinol base.

7. A method of photographically producing a visible image which comprises preparing the composition of claim 1; supporting said composition in a suitable binder, as a thin film; photographically exposing said film to light thereby producing a direct printout visible image and fixing said image by gently heating said film.

References Cited

UNITED STATES PATENTS

| | | | |
|---|---|---|---|
| 3,042,517 | 7/1962 | Wainer | 96—115 |
| 3,095,303 | 6/1963 | Sprague et al. | 96—90 |
| 3,102,810 | 9/1963 | Sprague | 96—33 |
| 3,275,443 | 9/1966 | Wainer | 96—90 |
| 3,374,094 | 3/1968 | Wainer et al. | 96—33 |

J. TRAVIS BROWN, *Primary Examiner.*

CAROLYN E. DAVIS, *Assistant Examiner.*

U.S. Cl. X.R.

96—90, 115